United States Patent
Liu et al.

(10) Patent No.: US 12,068,711 B2
(45) Date of Patent: Aug. 20, 2024

(54) HIGH FREQUENCY AC POWER DISTRIBUTION NETWORK FOR ELECTRIC VEHICLES

(71) Applicant: Toyota Motor Engineering & Manufacturing North America, Inc, Plano, TX (US)

(72) Inventors: Yanghe Liu, Ann Arbor, MI (US); Qunfang Wu, Westland, MI (US); Mengqi Wang, Troy, MI (US); Weiyang Zhou, Westland, MI (US); Chungchih Chou, Ann Arbor, MI (US); Hiroshi Ukegawa, South Lyon, MI (US)

(73) Assignees: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 93 days.

(21) Appl. No.: 17/166,380

(22) Filed: Feb. 3, 2021

(65) Prior Publication Data

US 2022/0247331 A1 Aug. 4, 2022

(51) Int. Cl.
*H02P 5/46* (2006.01)
*H02P 25/024* (2016.01)

(52) U.S. Cl.
CPC ............ *H02P 5/46* (2013.01); *H02P 25/024* (2016.02)

(58) Field of Classification Search
CPC .................................. H02P 5/46; H02P 25/024
(Continued)

(56) References Cited

U.S. PATENT DOCUMENTS 6,337,800 B1 * 1/2002 Chang ................. H05B 41/28
363/37
9,509,223 B2 * 11/2016 Hunter .............. H02M 3/33571
(Continued)

FOREIGN PATENT DOCUMENTS

CN 102035239 A 4/2011
CN 102611206 A 7/2012
(Continued)

OTHER PUBLICATIONS

Q. Wu et al., "High Frequency AC Power Distribution Network for Electric Vehicle Auxiliary Electrical System," 2020 IEEE Energy Conversion Congress and Exposition, 2020, pp. 891-896.*
(Continued)

*Primary Examiner* — Kawing Chan
(74) *Attorney, Agent, or Firm* — Jordan IP Law, LLC

(57) ABSTRACT

Methods, apparatuses and systems provide technology for a high frequency alternating-current (HFAC) distribution network for a vehicle that includes a plurality of HFAC zones coupled to a direct-current (DC) power source, the plurality of HFAC zones disbursed within the vehicle, where each HFAC zone includes a HFAC resonant inverter to convert DC power to HFAC power and a HFAC bus coupled to the HFAC resonant inverter, the HFAC bus to distribute the HFAC power to one or more loads. The technology includes a CLCL resonant tank circuit having two capacitors and two inductors, a push-pull circuit coupled to the CLCL resonant tank circuit, the push-pull circuit including a pair of switches, and a transformer to couple the inverter to the HFAC bus.

10 Claims, 4 Drawing Sheets

(58) Field of Classification Search
USPC .......................................................... 318/723
See application file for complete search history.

(56) References Cited

U.S. PATENT DOCUMENTS

| | | | |
|---|---|---|---|
| 9,567,979 B2 | 2/2017 | Goessling et al. | |
| 2014/0160799 A1* | 6/2014 | Gu | H02M 3/156 363/21.02 |
| 2015/0236600 A1* | 8/2015 | Waffler | H02M 3/01 363/21.02 |
| 2016/0226400 A1* | 8/2016 | Boys | H02M 1/36 |
| 2017/0104365 A1* | 4/2017 | Ghosh | H02J 9/061 |
| 2017/0222483 A1* | 8/2017 | Feng | H02J 50/90 |
| 2017/0279361 A1* | 9/2017 | Raju | H02M 1/12 |
| 2018/0345792 A1* | 12/2018 | Liu | B60L 50/51 |
| 2020/0252002 A1* | 8/2020 | Takemoto | H02M 7/53878 |

FOREIGN PATENT DOCUMENTS

| | | |
|---|---|---|
| CN | 103595109 B | 3/2016 |
| CN | 205202750 U | 5/2016 |
| CN | 105811597 A | 7/2016 |
| CN | 109889050 A | 6/2019 |
| WO | WO-2016127484 A1 * | 8/2016 |

OTHER PUBLICATIONS

C. Antaloae et al., "Investigation of high frequency AC power distribution benefits for the automobile auxiliary electrical system," SAE International Journal of Passenger Cars—Electronic and Electrical Systems, vol. 3, pp. 109-121.

* cited by examiner

HIGH FREQUENCY AC POWER DISTRIBUTION NETWORK FOR ELECTRIC VEHICLES

TECHNICAL FIELD

Embodiments generally relate to power distribution networks. More particularly, embodiments relate to a high frequency alternating-current (AC) power distribution network for use in electric vehicles.

BACKGROUND

Electric vehicles, such as autonomous vehicles, require many sensors and processing components that can be a significant load on a vehicle battery. Energy requirements for electric vehicles, including the auxiliary electrical systems in such vehicles, will likely increase in the future. High frequency AC power distribution systems may be considered for use in electric vehicles. However, there are limitations in such power distribution systems. For example, skin and proximity effects at high frequency operation lead to high conductor and distribution loss. In addition, high AC impedance in the transmission line increases the reactive power in the system, resulting in poor transmission efficiency.

BRIEF SUMMARY

In some embodiments, a high frequency alternating-current (HFAC) distribution network for a vehicle may include a plurality of HFAC zones coupled to a direct-current (DC) power source, the plurality of HFAC zones disbursed within the vehicle, wherein each HFAC zone comprises a HFAC resonant inverter to convert DC power to HFAC power, the HFAC resonant inverter including a CLCL resonant tank circuit, and a HFAC bus coupled to the HFAC resonant inverter, the HFAC bus to distribute the HFAC power to one or more loads.

In some embodiments, a high frequency alternating-current (HFAC) inverter for a vehicle may include a CLCL resonant tank circuit, a push-pull circuit coupled to the CLCL resonant tank circuit, the push-pull circuit including a pair of switches, and a transformer coupled to the CLCL resonant tank circuit, wherein the HFAC inverter is to convert DC power to HFAC power.

In some embodiments, a method of providing high frequency alternating-current (HFAC) power in a vehicle may include disbursing a plurality of HFAC zones within the vehicle, each of the HFAC zones coupled to a direct-current (DC) power source, wherein each HFAC zone comprises a HFAC resonant inverter to convert DC power to HFAC power, the HFAC resonant inverter including a CLCL resonant tank circuit, and a HFAC bus coupled to the HFAC resonant inverter, the HFAC bus to distribute the HFAC power to one or more loads.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
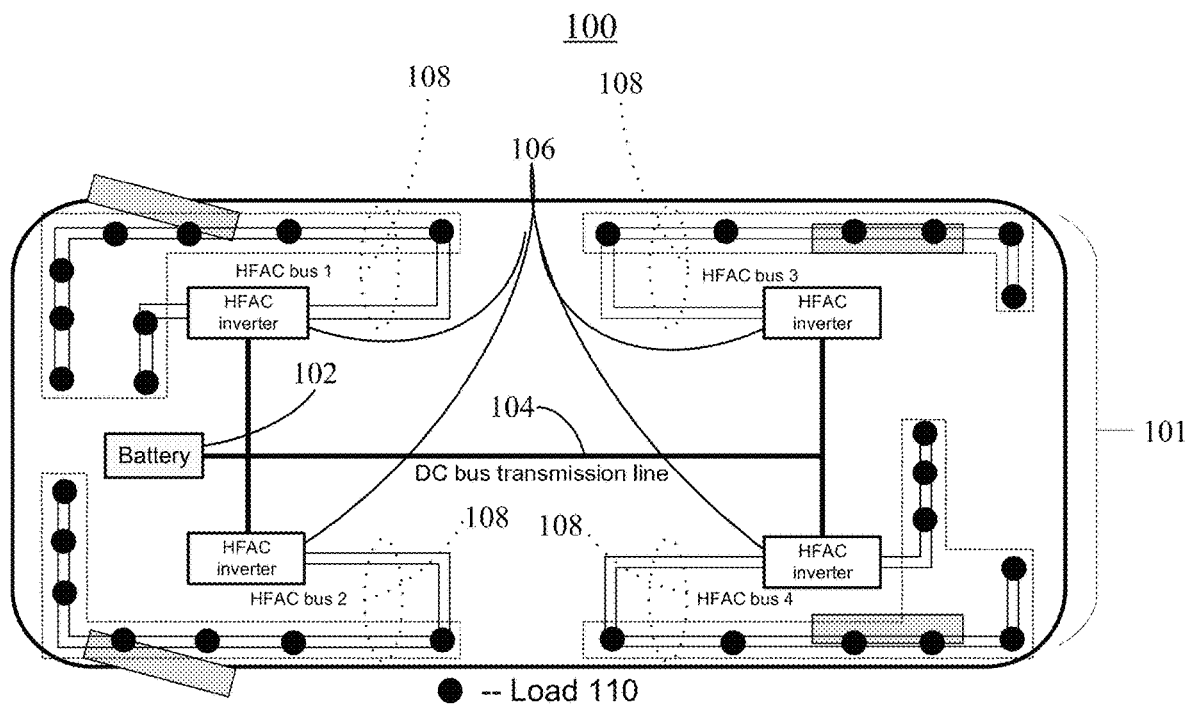
FIG. 1 is a diagram illustrating a vehicle with an example of a high frequency AC power distribution network according to one or more embodiments.

FIG. 1 presents a diagram illustrating a vehicle 100 with an example of a high frequency AC power distribution network 101 according to one or more embodiments, with reference to components and features described herein including but not limited to the figures and associated description. The high frequency AC power distribution network 101 may include a battery 102 to supply direct-current (DC) power, a DC bus transmission line (DC bus) 104 coupled to the battery 102 to distribute the DC power throughout the vehicle, a plurality of high frequency AC (HFAC) inverters 106 coupled to the DC bus 104, and a plurality of HFAC buses 108, each coupled to a high frequency AC (HFAC) inverter 106. The battery 102 may supply DC voltage and power, and may be a standard battery for use in automotive applications, such as a 12 volt battery, 48 volt battery, etc. The battery 102 may be the primary vehicle battery or a secondary/auxiliary vehicle battery. As shown in FIG. 1, the battery 102 may supply DC power via the DC bus 104 to the plurality of HFAC inverters 106. The DC bus 104 may be a standard DC power cable for use in automotive applications. Each HFAC inverter 106 is to convert the DC power to high frequency AC power at an appropriate or desired voltage, current and/or frequency. Further details of the HFAC inverter 106 are provided with reference to FIGS. 4A-4C herein.

The HFAC inverters 106 are to supply high frequency AC power to the plurality of HFAC buses 108. Each HFAC bus 108 may include an AC transmission line. Any line (e.g., cable) suitable for distributing HFAC power may be used for the AC transmission line. Further details of an example of an AC transmission line are provided with reference to FIGS. 3A-3B herein.

The HFAC inverters 106 and HFAC buses 108 may be disbursed (e.g., arranged, located or placed) in various places throughout the vehicle 101. Four HFAC inverters 106 and four HFAC buses 108 are shown in FIG. 1 for illustrative purposes, each HFAC inverter 106 being coupled to one HFAC bus 108, but other configurations may be implemented. For example, the plurality of HFAC inverters 106 may include five, six, seven, eight, etc. inverters 106, and each HFAC inverter 106 may be coupled to one or more HFAC buses 108.

Each HFAC bus 108 may be coupled to, and deliver HFAC power to, one or more loads 110 (shown as small black circles in FIG. 1). A load 110 may include any device or component that uses electric power, such as, for example, switches, sensors, processors, and various items of equipment such as blower motors, wipers, indicator lights, fuel pumps, water pumps, cooling fans, air conditioning compressors, front screens, etc. Each of the loads 110 may be designed or provided to operate on the HVAC power provided by the respective HFAC bus 108. In some instances, one or more of the loads 110 may operate on a different voltage, and a transformer and/or converter may be provided (not shown in FIG. 1) to convert the supplied HFAC power to the power required for the respective load 110. For example, if one or more of the loads 110 operate on DC voltage, a converter may be provided to convert the HFAC power to the required DC voltage. Some or all of the DC bus 104, the HFAC inverters 106, the HFAC buses 108 and the loads 110 may be part of an auxiliary electrical system within an electric vehicle.

Disbursement (i.e., arrangement, location or placement) of the plurality of HFAC inverters 106 and the plurality of HFAC buses 108 may be selected or determined, based on the number and location or placement of the loads 110. For example, location or placement of the plurality of HFAC inverters 106 and the plurality of HFAC buses 108 may be made in a manner to shorten or minimize the length of the AC transmission line(s) in one or more of the plurality of HFAC buses 108. A shorter length of AC transmission line allows for use of higher AC frequencies and improved performance for the distribution of HFAC power. For example, placement of the plurality of HFAC inverters 106 and the plurality of HFAC buses 108 may be selected or determined based on grouping of loads 110 into compact areas within the vehicle 100. For example, selection and location of the plurality of HFAC inverters 106 and the plurality of HFAC buses 108 may be determined such that the AC transmission line in each HFAC bus 108 is shorter than a threshold length. In some embodiments, the threshold length may be approximately four (4) feet; in some embodiments, the threshold length may be approximately one-fourth the length of the vehicle. In addition, each HFAC inverter 106 (along with its associated HFAC bus 108) operates independently from the other HFAC inverters 106, thus enhancing system reliability.

Figure 2:
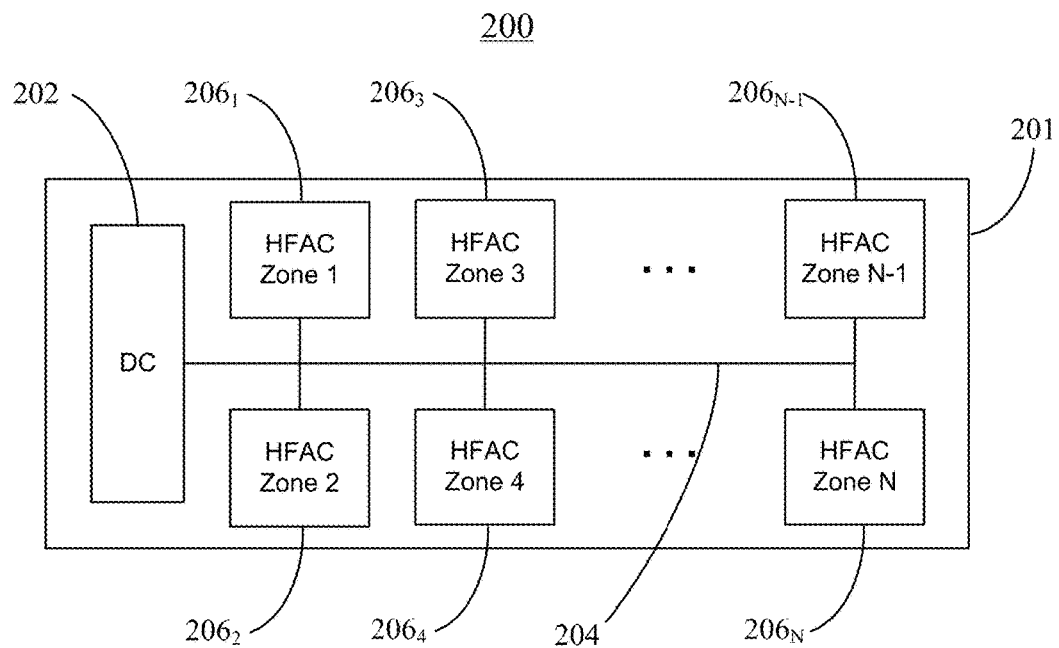
FIG. 2 is a diagram illustrating another example of a high frequency AC power distribution network for a vehicle according to one or more embodiments.

FIG. 2 presents a block diagram illustrating another example of high frequency AC power distribution network 201 for a vehicle 200 according to one or more embodiments, with reference to components and features described herein including but not limited to the figures and associated description. The high frequency AC power distribution network 201 may correspond to the high frequency AC power distribution network 101 (FIG. 1, already discussed). The high frequency AC power distribution network 201 may include a DC power source 202 to supply direct-current (DC) power, a DC bus transmission line (DC bus) 204 coupled to the DC power source 202 to distribute the DC power throughout the vehicle, and a plurality of N HFAC zones 206 (denoted in FIG. 2 as $206_1$, $206_2$, ..., $206_{N-1}$, $206_N$). The DC power source 202 may correspond to one or more of the batteries 102 (FIG. 1, already discussed), and the DC bus 204 may correspond to the DC bus 104 (FIG. 1, already discussed). Each HFAC zone 206 may be coupled to the DC bus 204, and may include an HFAC inverter to supply high frequency AC power via an HFAC bus to one or more loads (not shown separately in FIG. 2). Each HFAC zone 206 may correspond to an HFAC inverter 106 being coupled to an HFAC bus 108, which in turn is coupled to one or more loads 110 (FIG. 1, already discussed). Each HFAC zone 206 may be disbursed (i.e., arranged, located or placed) within the vehicle 201 based on the number and location or placement of the loads. For example, location or placement of the plurality of HFAC zones 206 may be made in a manner to shorten or minimize the length of the AC transmission line(s) in one or more of the plurality of HFAC zones 206. The number of HFAC zones N may include three, four, five, six, seven, eight, or more.

Figure 3A:
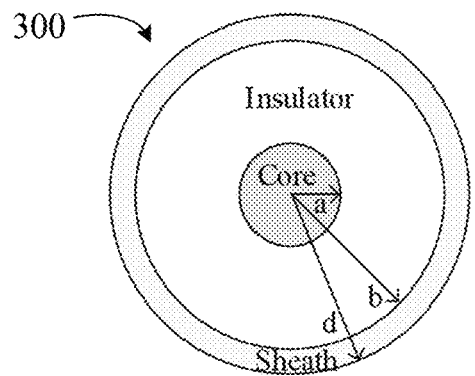
FIG. 3A provides a diagram illustrating an example of an AC transmission line for use in one or more embodiments.

FIG. 3A provides a diagram illustrating an example of an AC transmission line 300 for use in one or more embodiments to distribute AC power provided by an HFAC inverter (such as HFAC inverter 106 in FIG. 1) via an HFAC bus (such as HFAC bus 108 in FIG. 1) to one or more loads (such as loads 110 in FIG. 1). The AC transmission line 300 may include a conducting core to carry the AC power signal, a surrounding insulator, and an outer sheath. The conducting core may have a radius a, the surrounding insulator may have a radius b, and the outer sheath may have a radius d. The outer sheath may be a conductor to carry the return for the AC power signal. The AC transmission line 300 may also include an outer insulating covering such as vinyl, plastic, rubber, etc. (not shown in FIG. 3A). As illustrated, the AC transmission line 300 is shown in FIG. 3A as a coaxial cable, but any transmission line suitable for transmitting HFAC power may be used.

Figure 3B:
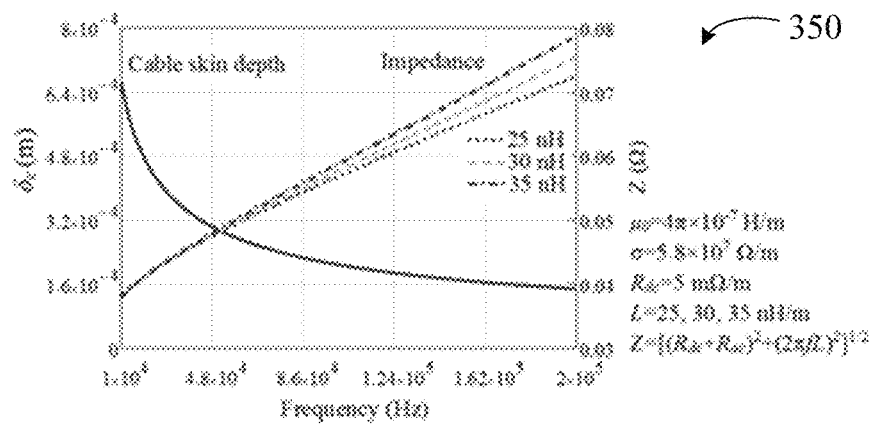
FIG. 3B provides a diagram of a plot showing characteristics of an example AC transmission line.

FIG. 3B provides a plot 350 showing characteristics of an example AC transmission line 300 (FIG. 3A, already discussed) as a function of frequency. As shown in plot 350, the cable skin depth $\delta_c$ decreases with increasing frequency, while cable impedance Z increases with increasing frequency. The increasing cable impedance results in power losses and voltage drops per unit length, which further illustrates the need for shorter AC transmission lines for transmitting HFAC power.

Figure 4A:
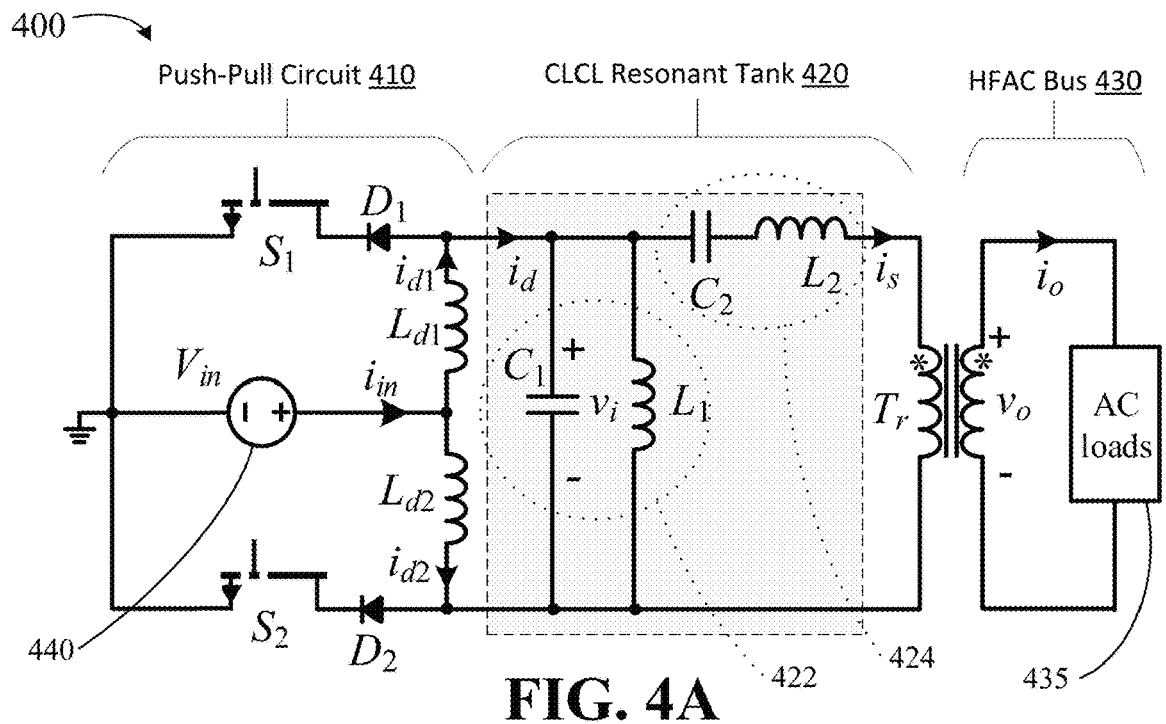
FIGS. 4A-4C provide diagrams illustrating an example of a high frequency AC inverter circuit according to one or more embodiments.

FIG. 4A is a diagram illustrating an example of a high frequency AC (HFAC) resonant inverter 400 according to one or more embodiments, with reference to components and features described herein including but not limited to the figures and associated description. The HFAC resonant inverter 400 may correspond to HFAC inverter 106 (FIG. 1, already discussed). The HFAC resonant inverter 400 may include a push-pull circuit 410, a CLCL resonant tank circuit 420 coupled to the push-pull circuit 410, and a high frequency transformer $T_r$ coupled (via input or primary terminals of the transformer) to the CLCL resonant tank circuit 420. The output or secondary terminals of the transformer $T_r$ may be coupled to HFAC bus 430, which may, in turn, be coupled to one or more AC loads 435. The HFAC bus 430 may correspond to HFAC bus 108, and the one or more AC loads 435 may correspond to one or more of the loads 110 (FIG. 1, already discussed).

The push-pull circuit 410 may be a current-fed push-pull circuit. As shown in FIG. 4A, the push-pull circuit 410 may include a DC voltage ($V_{in}$) 440, which may be supplied by a DC source such as battery 102 provided via DC bus 104 (FIG. 1, already discussed) or DC power source 202 provided via DC bus 204 (FIG. 2, already discussed). The positive of DC voltage ($V_{in}$) 440 may be coupled to a first terminal of each of a pair of inductors, $L_{d1}$ and $L_{d2}$. The inductors $L_{d1}$ and $L_{d2}$ may be conventional inductors. The negative of DC voltage ($V_{in}$) 440 may be coupled to circuit ground (i.e., ground), which may be vehicle ground. A second terminal of inductor $L_{d1}$ may be coupled through a diode $D_1$ to a first terminal of switch $S_1$. A second terminal of switch $S_1$ may be coupled to ground. A second terminal of inductor $L_{d2}$ may be coupled through a diode $D_2$ to a first terminal of switch $S_2$. A second terminal of switch $S_2$ may be coupled to ground. Each of the switch $S_1$ and the switch $S_2$ may be a power transistor (e.g., silicon or silicon-carbide devices) having a signal or gate terminal to turn the respective transistor (i.e., switch) on or off, and may be selected as suitable for high power circuits based on power requirements. For example, each of the switch $S_1$ and the switch $S_2$ may be power MOSFET transistors. The diodes $D_1$ and $D_2$ may be conventional semiconductor diodes suitable for high power circuits. In some embodiments, considering the potential heat dissipation, each HFAC inverter may be designed with a power output level equal to or less than 1 kW. In some embodiments, the auxiliary battery output voltage may be used as the HFAC inverter input voltage, e.g., 12 V or 42V, and the output AC voltage may be 100 VAC. In some embodiments, the output frequency may be in the range of 150 kHz-250 kHz, to reduce the skin effect.

The CLCL resonant tank circuit 420 may be a fourth-order CLCL filter with two capacitors and two inductors. As shown in FIG. 4A, the CLCL resonant tank circuit 420 may include a capacitor $C_1$ and an inductor $L_1$ coupled in parallel (label 422). A first terminal of each of the capacitor $C_1$ and the inductor $L_1$ may be coupled to a first terminal of a series connection of a capacitor $C_2$ and an inductor $L_2$ (label 424); the capacitor $C_2$ and the inductor $L_2$ may be coupled together in series in order $C_2$-$L_2$ or in order $L_2$-$C_2$. The inductors $L_1$ and $L_2$ may be conventional inductors suitable for high power AC circuits, and the capacitors $C_1$ and $C_2$ may be conventional capacitors suitable for high power AC circuits.

As shown in FIG. 4A, the output of the push-pull circuit 410 may be coupled to the input of the CLCL resonant tank circuit 420 as follows: (a) the second terminal of inductor $L_{d1}$ may be coupled to the first terminal of each of the capacitor $C_1$ and the inductor $L_1$, and (b) the second terminal of inductor $L_{d2}$ may be coupled to a second terminal of each of the capacitor $C_1$ and the inductor $L_1$. The output of the CLCL resonant tank circuit 420 may be coupled to the input or primary terminals (e.g., primary winding) of the transformer $T_r$ as follows: (a) a second terminal of the series connection of the capacitor $C_2$ and an inductor $L_2$ (label 424) may be coupled to a first input or primary terminal of the transformer $T_r$, (b) the second terminal of each of the capacitor $C_1$ and the inductor $L_1$ may be coupled to a second input or primary terminal of the transformer $T_r$. The transformer $T_r$ may be a conventional transformer, suitable for high-power AC circuits, where the turn ratio (i.e., ratio of primary to secondary windings) may be selected as appropriate to generate a desired AC voltage/current for a given output of the CLCL resonant tank circuit 420.

Figure 4B:
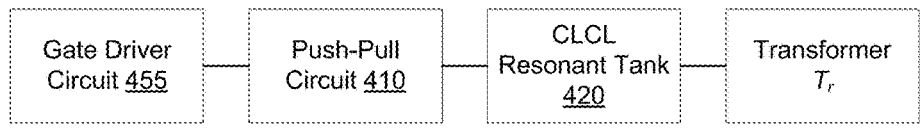

FIG. 4B presents a block diagram 450 further illustrating the HFAC resonant inverter 400 according to one or more embodiments, with reference to components and features described herein including but not limited to the figures and associated description. As described with reference to FIG. 4A, the HFAC resonant inverter 400 may include the push-pull circuit 410, the CLCL resonant tank circuit 420, and the transformer $T_r$. A gate driver circuit 455 may be coupled to and provide input signals for the signal input (e.g., gate) terminal of each of the switches in the push-pull circuit 410. The gate driver circuit may selectively turn various ones of the transistors (switches) in the circuit 410 on or off so as to control the currents $i_{d1}$ and/$i_{d2}$ through the respective inductors $L_{d1}$ and $L_{d2}$. The operating frequency $\omega_o$ for the HFAC inverter circuit may be generated (i.e. set) based on the speed/timing at which the switch $S_1$ and the switch $S_2$ are turned on and off via the gate driver circuit. In some embodiments, the operating frequency may be set within a range of 150 kHz-250 kHz.

Figure 4C:
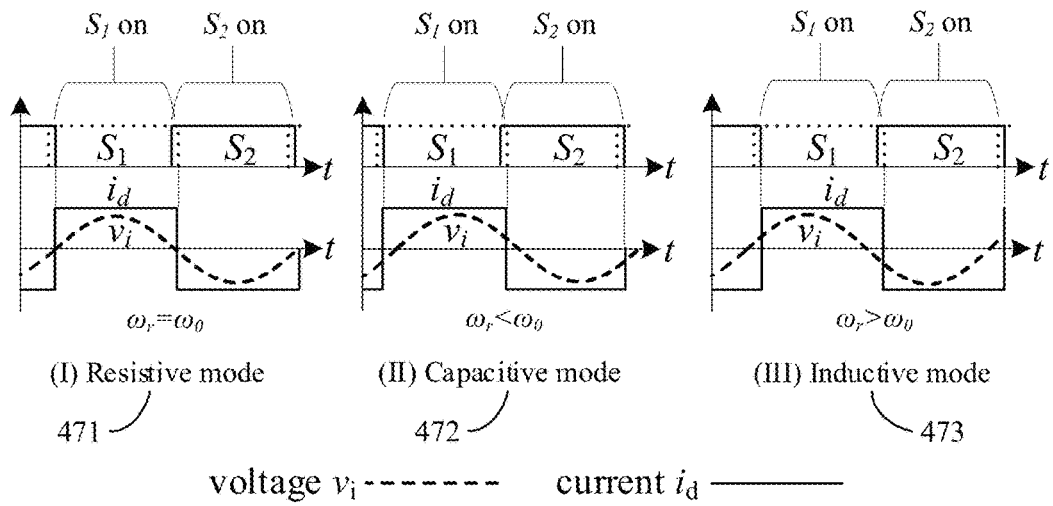

FIG. 4C is a diagram 470 illustrating modes of operation of the HFAC resonant inverter 400 according to one or more embodiments, with reference to components and features described herein including but not limited to the figures and associated description. As described herein, the operating frequency $\omega_0$ may be set based on the speed/timing at which the switch $S_1$ and the switch $S_2$ are turned on and off via the gate driver circuit. Depending on respective values of circuit components of the CLCL resonant tank circuit 420, which establish the resonant frequency $\omega_r$, and the selected operating frequency $\omega_o$, the HFAC resonant inverter 400 may operate in one of three modes: a resistive mode (label 471) where $\omega_r=\omega_o$, a capacitive mode (label 472) where $\omega_r<\omega_o$, or an inductive mode (label 473) where $\omega_r>\omega_o$. As shown for each of the operating modes, the pair of switches $S_1$ and $S_2$ are turned on and off in alternating fashion, such that when switch $S_1$ is on switch $S_2$ is off, and when switch $S_2$ is on switch $S_1$ is off. As shown in FIG. 4C, in some embodiments there may be some overlap between conducting stages of switches $S_1$ and $S_2$ such that they may both be on together for a relatively short length of time.

For the resistive mode (label 471), where $\omega_r=\omega_o$, the input impedance seen from the input port of CLCL resonant tank $Z_{in}$ is resistive. As depicted in the signal plot (label 471), the resonant voltage $v_i$ ($v_i$ is the voltage across capacitor $C_1$ as shown in FIG. 4A) is in phase with the fundamental current $i_d$ (the current $i_d$ is indicated in FIG. 4A). In the resistive mode, switches $S_1$ and $S_2$ can realize zero-voltage-switching (ZVS) for both turn-on and turn-off, which minimizes switching losses. For the capacitive mode (label 472) where $\omega_r<\omega_o$, the input impedance $Z_{in}$ is capacitive and, as shown in the signal plot (label 472), the resonant voltage $v_i$ is lagging the fundamental current $i_d$. In the capacitive mode, ZVS can be achieved for switch turn-off only. For the inductive mode (label 473) where $\omega_r>\omega_o$, input impedance $Z_{in}$ is inductive and, as shown in the signal plot (label 473), the resonant voltage $v_i$ is leading the fundamental current $i_d$. In the inductive mode, ZVS can be achieved for switch turn-on only. Accordingly, to minimize switching loss, the resistive operating mode is preferred. Resistive mode operation may be achieved by matching the inverter switching frequency to the resonant frequency of the parallel tank (i.e., the same or approximately the same frequency), such that there is minimal or no phase difference between the HFAC bus voltage and current.

Figure 5A:
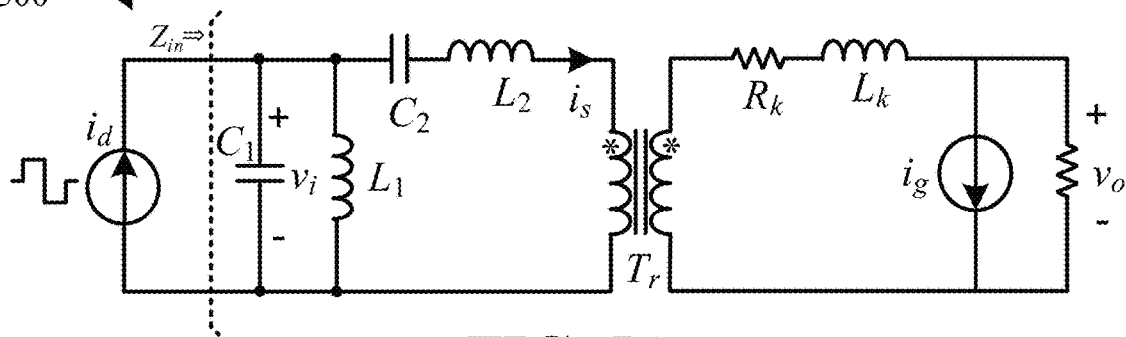
FIGS. 5A-5B provide diagrams illustrating characteristics for an example of a high frequency AC inverter circuit according to one or more embodiments.

FIG. 5A is a diagram illustrating a general equivalent circuit 500 for the HFAC resonant inverter 400 according to one or more embodiments, with reference to components and features described herein including but not limited to the figures and associated description. For the illustrated general equivalent circuit 500, input perturbations of the input line and output loads are represented by current sources $i_d$ and $i_g$, respectively. The inverter interfaces the load through the HFAC bus line, which can be modeled as inductance $L_k$ and resistance $R_k$. The phase angle between the resonant voltage $v_i$ and the fundamental component of the input current $i_d$ is the phase angle $\varphi$ of the input impedance $Z_{in}(\omega)$. This angle is dependent on both the resonant tank and load. The input impedance $Z_{in}$ is evaluated at the input equivalent to the CLCL tank circuit, as shown in FIG. 5A.

Figure 5B:
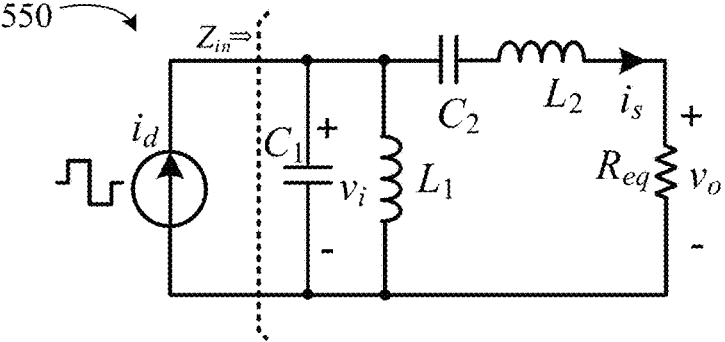

FIG. 5B is a diagram illustrating an equivalent circuit 550 for the HFAC resonant inverter 400 according to one or more embodiments, with reference to components and features described herein including but not limited to the figures and associated description. The equivalent circuit 550 may be obtained from the equivalent circuit 500 by modeling with a resistive load $R_{eq}$. Similar to FIG. 5A, the input impedance $Z_{in}$ is evaluated at the input equivalent to the CLCL tank circuit, as shown in FIG. 5B. For the equivalent circuit 550, the input impedance $Z_{in}(\omega)$ may be expressed as follows:

$$Z_{in}(\omega) = \frac{-\omega^2 L_1 C_2 R_{eq} + j(\omega L_1 - \omega^3 L_1 L_2 C_2)}{[\omega^4 L_1 C_1 L_2 C_2 - \omega^2(L_1 C_1 + L_1 C_2 + L_2 C_2) + 1] + j(\omega C_2 - \omega^3 L_1 C_1 C_2) R_{eq}} \quad \text{Eq. (1)}$$

In some embodiments, the design of the resonant tank (e.g., CLCL resonant tank circuit 420) may be simplified by setting the inductance values $L_1$ and $L_2$ to be the same value (L), and setting the capacitance values $C_1$ and $C_2$ to be the same value (C). As such, $Z_{in}(\omega)$ and $\varphi$ may be expressed as follows:

$$\begin{cases} Z_{in}(\omega) = \dfrac{-\beta^2 Q R_{eq} + j\beta Q^2 R_{eq}(1-\beta^2)}{Q(\beta^4 - 3\beta^2 + 1) + j\beta(1-\beta^2)}, \\ \varphi = \tan^{-1}\left(\dfrac{Q(\beta^2 - 1)}{\beta}\right) - \tan^{-1}\left(\dfrac{\beta(1-\beta^2)}{Q(\beta^4 - 3\beta^2 + 1)}\right) \end{cases} \quad \text{Eq. (2)(a)-(b)}$$

where $\beta = \omega/\omega_r$, $Q = (\omega_r L)/R_{eq} = 1/(\omega_r C R_{eq})$, $\omega_r = 1/\sqrt{LC}$
Similarly, the input-output gain $G_{vi}$ can be expressed as:

$$\begin{cases} G_{vi} = \dfrac{V_o(\omega)}{I_d(\omega)} = \dfrac{-\beta^2 Q R_{eq}}{Q(\beta^4 - 3\beta^2 + 1) - j\beta(\beta^2 - 1)} \\ \theta = \tan^{-1}\left(\dfrac{\beta(1-\beta^2)}{Q(\beta^4 - 3\beta^2 + 1)}\right) \end{cases} \quad \text{Eq. (3)(a)-(b)}$$

At the resonant point of $\beta=1$, $|Z_{in}|$ is equal to $R_{eq}$ for any value of Q, and the phase angle $\varphi$ is 0. Meanwhile, at this point, $|G_{vi}|$ becomes unity and $\theta$ is 0, regardless of the value of Q. Accordingly, when the switching angular frequency $\omega_o$ of the inverter is set exactly to the resonant angular frequency $\omega_r$, the result is a load-invariant input impedance and transfer gain for the HFAC bus.

Selection of components and component values for the HFAC resonant inverter 400 may vary based on specific design criteria, such as operating (i.e., switching) frequency, DC voltage input, power requirements, etc. For example, in one or more embodiments a gallium nitride (GaN) power transistor such as GS61004B or equivalent may be used as each of the switches $S_1$ and $S_2$. In one or more embodiments, a semiconductor diode such as RFNT20TJ6S or equivalent may be used as each of the diodes $D_1$ and $D_2$. In one or more embodiments, a HFAC resonant inverter (such as HFAC resonant inverter 400) may have a switching or operating frequency of 200 kHz (or an approximation thereof), with an input DC voltage of 32V and an output AC voltage of 100 VAC and 125 W (or an approximation thereof), using the following component values:

| Component | Value |
|---|---|
| $Ld_1$ & $Ld_2$ | 500 μH |
| $C_1$ & $C_2$ | 200 nF |
| $L_1$ & $L_2$ | 3.4 μH |
| $T_r$ turns ratio | 1:1 |
| $S_1$ & $S_2$ | GS61004B |
| $D_1$ & $D_2$ | RFNT20TJ6S |

Figure 6:
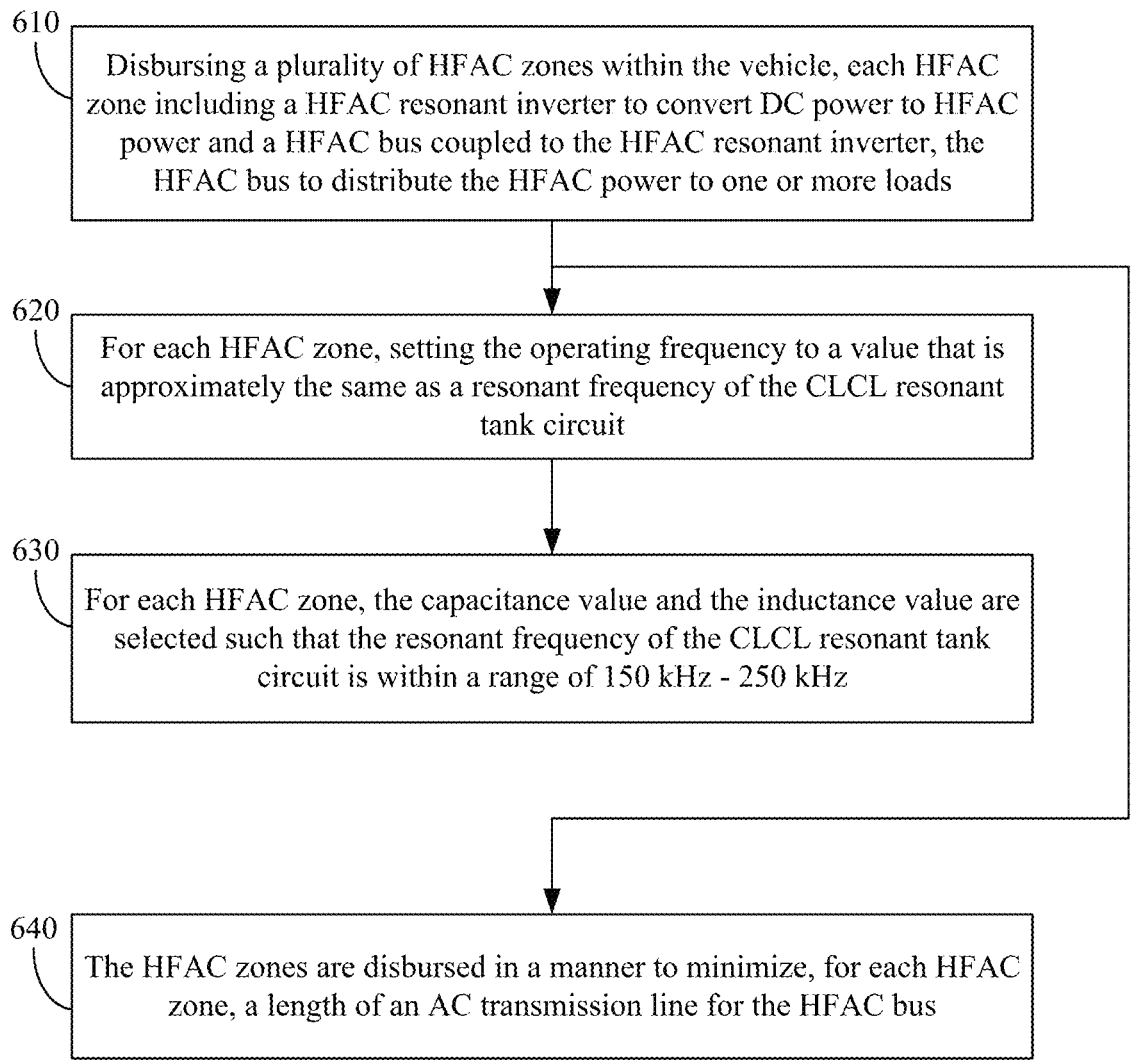
FIG. 6 provides a flowchart illustrating a method of providing high frequency alternating-current (HFAC) power in a vehicle according to one or more embodiments.

FIG. 6 provides a flowchart illustrating a method 600 of providing high frequency alternating-current (HFAC) power in a vehicle according to one or more embodiments, with reference to components and features described herein including but not limited to the figures and associated description. At block 610, a plurality of HFAC zones may be disbursed within the vehicle, each HFAC zone including a HFAC resonant inverter to convert DC power to HFAC power and a HFAC bus coupled to the HFAC resonant inverter, the HFAC bus to distribute the HFAC power to one or more loads. The HFAC zones may correspond to HFAC zones 206 (FIG. 2, already discussed). The HFAC resonant inverter may include a CLCL resonant tank circuit. In some embodiments, the CLCL resonant tank circuit may include two capacitors and two inductors. In some embodiments, for each HFAC zone, the HFAC resonant inverter may further include a push-pull circuit coupled to the CLCL resonant tank circuit. The push-pull circuit may include a pair of switches, and a transformer coupled to the CLCL resonant tank circuit, where, for each HFAC zone, the HFAC bus is coupled to the HFAC resonant inverter through the transformer. The CLCL resonant tank circuit may correspond to CLCL resonant tank circuit 420 (FIG. 4A, already discussed). The push-pull circuit may correspond to push-pull circuit 410 (FIG. 4A, already discussed).

At block 620, for each HFAC zone, the operating frequency may be set to a value that is approximately the same as a resonant frequency of the CLCL resonant tank circuit. In some embodiments, for each HFAC zone, the HFAC resonant inverter may further include a gate driver circuit coupled to the push-pull circuit to selectively turn each switch of the pair of switches on and off to set the operating frequency.

At block 630, for each HFAC zone, the capacitance value and the inductance value of the capacitors and inductors in the CLCL resonant tank circuit are selected such that the resonant frequency of the CLCL resonant tank circuit is within a range of 150 kHz-250 kHz. In some embodiments, each of the two capacitors may have the same capacitance value, and each of the two inductors may have the same inductance value.

At block 640, the HFAC zones may be disbursed in a manner to minimize, for each HFAC zone, a length of an AC transmission line for the HFAC bus. In various embodiments, a variety of configurations may be implemented. For example, the number of HFAC zones N may include three, four, five, six, seven, eight, or more zones, and within any given zone the HFAC resonant inverter may be coupled to one or more HFAC buses.

The disclosed HFAC power distribution network with AC inverter circuit may achieve a high quality sine voltage and current output, realize soft-switching for both switches independent of the load variation, and achieve a fixed bus voltage irrespectively of the load variation. Additionally, the disclosed HFAC power distribution network with AC inverter circuit may permit advantages in using higher-frequency AC power, such as reduced size of components and increased safety.

The above described methods and systems may be readily combined together if desired. The term "coupled" may be used herein to refer to any type of relationship, direct or indirect, between the components in question, and may apply to electrical, mechanical, fluid, optical, electromagnetic, electromechanical, or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A high frequency alternating-current (HFAC) distribution network for a vehicle comprising:
a plurality of HFAC zones coupled to a direct-current (DC) power source, the plurality of HFAC zones disbursed within the vehicle, wherein each HFAC zone comprises:
a HFAC resonant inverter to convert DC power to HFAC power, the HFAC resonant inverter including a CLCL resonant tank circuit, a push-pull circuit coupled to the CLCL resonant tank circuit, the push-pull circuit including a pair of switches, and a gate driver circuit coupled to the push-pull circuit to selectively turn each switch of the pair of switches on and off to set an operating frequency; and
a HFAC bus coupled to the HFAC resonant inverter, the HFAC bus to distribute the HFAC power to one or more loads;
wherein each HFAC resonant inverter and hence each HFAC zone is operated independently of all other HFAC inverters and HFAC zones, without a high-frequency connection between any HFAC zones,
wherein, for each HFAC zone, the operating frequency is maintained at a value that matches a resonant frequency of the CLCL resonant tank circuit,
wherein the CLCL resonant tank circuit comprises two capacitors and two inductors,
wherein a first capacitor of the two capacitors and a first inductor of the two inductors form a parallel L-C subcircuit,
wherein a second capacitor of the two capacitors and a second inductor of the two inductors form a series L-C subcircuit,
wherein each of the two capacitors have the same capacitance value, and wherein each of the two inductors have the same inductance value, and
wherein the resonant frequency is based on the capacitance value of the two capacitors and the inductance value of the two inductors.

2. The HFAC distribution network of claim 1, wherein, for each HFAC zone, the HFAC resonant inverter further includes a transformer coupled to the CLCL resonant tank circuit, and wherein, for each HFAC zone, the HFAC bus is coupled to the HFAC resonant inverter through the transformer.

3. The HFAC distribution network of claim 2, wherein in the CLCL resonant tank circuit a first end of the parallel L-C subcircuit is directly connected to a first end of the series L-C subcircuit and the first end of the parallel L-C subcircuit is not directly connected to the transformer.

4. The HFAC distribution network of claim 1, wherein, for each HFAC zone, the capacitance value and the inductance value are selected such that the resonant frequency of the CLCL resonant tank circuit is within a range of 150 kHz-250 kHz.

5. The HFAC distribution network of claim 1, wherein the HFAC zones are disbursed in a manner to minimize, for each HFAC zone, a length of an AC transmission line for the HFAC bus.

6. A method of providing high frequency alternating-current (HFAC) power in a vehicle, comprising:
disbursing a plurality of HFAC zones within the vehicle, each of the HFAC zones coupled to a direct-current (DC) power source, wherein each HFAC zone comprises:
a HFAC resonant inverter to convert DC power to HFAC power, the HFAC resonant inverter including a CLCL resonant tank circuit, a push-pull circuit coupled to the CLCL resonant tank circuit, the push-pull circuit including a pair of switches, and a gate driver circuit coupled to the push-pull circuit to selectively turn each switch of the pair of switches on and off to set an operating frequency; and
a HFAC bus coupled to the HFAC resonant inverter, the HFAC bus to distribute the HFAC power to one or more loads; and
maintaining, for each HFAC zone, the operating frequency at a value that matches a resonant frequency of the CLCL resonant tank circuit,
wherein each HFAC resonant inverter and hence each HFAC zone is operated independently of all other HFAC inverters and HFAC zones, without a high-frequency connection between any HFAC zones,
wherein the CLCL resonant tank circuit comprises two capacitors and two inductors,
wherein a first capacitor of the two capacitors and a first inductor of the two inductors form a parallel L-C subcircuit,
wherein a second capacitor of the two capacitors and a second inductor of the two inductors form a series L-C subcircuit,
wherein each of the two capacitors have the same capacitance value, and wherein each of the two inductors have the same inductance value, and
wherein the resonant frequency is based on the capacitance value of the two capacitors and the inductance value of the two inductors.

7. The method of claim 6, wherein, for each HFAC zone, the HFAC resonant inverter further includes a transformer coupled to the CLCL resonant tank circuit, and wherein, for each HFAC zone, the HFAC bus is coupled to the HFAC resonant inverter through the transformer.

8. The method of claim 7, wherein, for each HFAC zone, the capacitance value and the inductance value are selected such that the resonant frequency of the CLCL resonant tank circuit is within a range of 150 kHz-250 kHz.

9. The method of claim 7, wherein in the CLCL resonant tank circuit a first end of the parallel L-C subcircuit is directly connected to a first end of the series L-C subcircuit and the first end of the parallel L-C subcircuit is not directly connected to the transformer.

10. The method of claim 6, wherein the HFAC zones are disbursed in a manner to minimize, for each HFAC zone, a length of an AC transmission line for the HFAC bus.

* * * * *